United States Patent Office 2,944,056
Patented July 5, 1960

2,944,056
METHOD OF PRODUCING QUINAZOLINE DERIVATIVES

Shunsuke Murahashi and Shigeki Horiie, Sakai, Japan, assignors to Sumitomo Chemical Company, Ltd., Osaka, Japan, a corporation of Japan No Drawing. Filed May 22, 1957, Ser. 660,773

4 Claims. (Cl. 260—251)

This invention relates to a new method of producing quinazoline derivatives and/or indazolone derivatives by contacting carbon monoxide with azobenzene derivatives at superatmospheric pressure in the presence of a cobalt or iron catalyst. More particularly the present invention relates to a new method of producing quinazoline derivatives wherein carbon monoxide is contacted with azobenzene derivatives at a superatmospheric pressure at a temperature below 200° C. in the presence of a cobalt or iron catalyst and, either taking out or without taking out the thus obtained indazolone derivatives, the above reaction is repeated at a temperature above 200° C. to produce quinazoline derivates. The quinazoline derivatives may directly be produced by contacting carbon monoxide with the starting material of azobenzene at a temperature above 200° C. in the presence of the same catalyst. In such reaction, indazolone cannot be isolated.

The method of the present invention is represented by the following reaction formula:

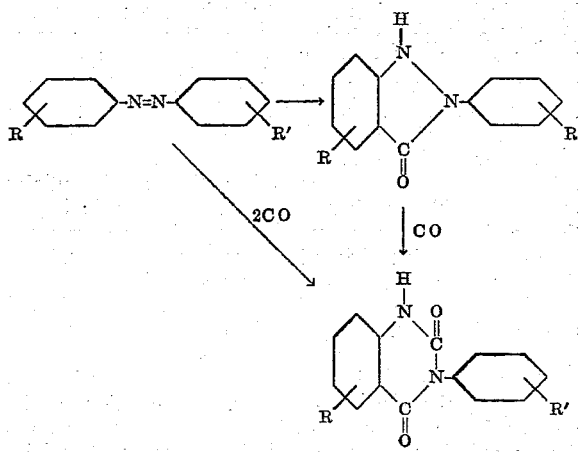

wherein R and R' are selected from the group consisting of hydrogen and halogen atoms, and lower alkyl, lower alkoxy, hydroxy, amino, di-(lower alkyl) amino and aryl radicals.

The indazolone derivatives and quinazoline derivatives obtained by the present method are very valuable compounds as synthetic chemical intermediates in producing dyestuffs, medicines and industrial chemicals.

Numerous methods of producing quinazoline derivatives from anthranilic acid and phenylurea have already been known. (For example, Ber. 43, 1237, 1910.) One of the convenient methods is, as recently practiced, to obtain them from phenylurea and carbon dioxide (Chemical Abstracts, 48, 8790, 1940), but the yield of this method is only 10% at the highest. The synthesis of indazolone derivatives is more complicated. For example, though they can be produced by the reaction between 2-phenylhydrazinobenzoic acid (Ber. 55, 2680, 1922) and $POCl_3$ or between azobenzenecarboxylic acid-(2) and chromic acid (Ber. 55B, 1112, 1922), the yield is very low in either case. W. W. Pritchard teaches in his U.S.P. 2,769,003 that the lactones of 2-(3-hydroxyindazol-2-yl) monocarboxylic acid and quinazoline derivatives are produced from the reaction of nickel carbonyl on azobenzene. However, the method can produce nothing but a mixture of the both compounds and the yield of quinazoline derivatives moiety is extremely low. This is due, we assume, to the fact that the nickel carbonyl is of such type of carbonyl compound that it can not produce hydrocarbonyl. From the foregoing, it is clear that appearance of an economical and practical method of producing such compounds has been earnestly looked for in the art.

The present invention is based on our discovery of a new reaction of carbon monoxide at superatmospheric pressure with the Schiff's base (Journal of American Chemical Society, 77, 6403, 1955). More particularly, it has been found that a new reaction occurs when carbon monoxide is contacted with a raw material of aromatic azo compound at superatmospehic pressure in the presence of said catalyst and that indazolone derivatives and quinazoline derivatives are produced at high yields by such unexpected reaction.

In accordance with the invention, when carbon monoxide is contacted at superatmospheric pressure with azobenzene derivatives represented by the general formula

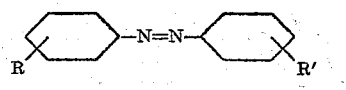

wherein R and R' are selected from the group consisting of (hydrogen, halogen, lower alkyl, lower alkoxy, hydroxy, amino, di-(lower alkyl) amino and aryl groups in the presence of such metallic carbonyl catalyst as, for example, cobalt carbonyl or iron carbonyl, which can produce hydrocarbonyl in a substantially anhydrous organic solvent indazolone derivatives represented by the general formula),

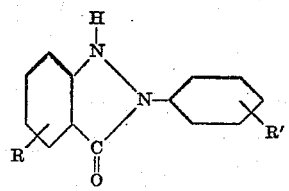

(wherein R and R' are the same as are mentioned above) and/or quinazoline derivatives represented by the general formula

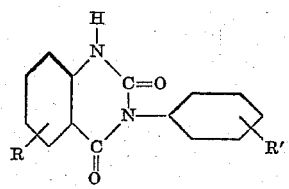

(wherein R and R' are the same as are mentioned above) will be obtained independently in economical yields without accompanying substantially any troublesome by-produced impurities. It is also found that the present reaction requires to be carried out under a substantially anhydrous condition and any carbonyl catalyst which cannot produce such hydrocarbonyl as nickel carbonyl which is described in aforementioned U.S.P. 2,769,003 cannot successfully be used in the method of the present invention. Further, according to the researches made by the inventors, it is also found that, in the reaction of the present invention, as shown by the above mentioned reaction formula, in case 1 mol of carbon monoxide acts on azobenzene derivatives, the indazolone derivatives represented by the above general formula are obtained and, in case 2 mols of carbon monoxide act thereon, the quinazoline derivatives represented by the above general formula are obtained. Each of these two processes can be freely selected by controlling the reaction temperature. If need be, the quinazoline derivatives represented by the above general formula can likewise be obtained by contacting 1 mol of carbon monoxide with the indazolone derivatives represented by the above general formula at a temperature above 200° C.

An object of the present invention is to provide a new method of producing indazolone derivatives and quinazoline derivatives from azobenzene derivatives.

Another object of the present invention is to provide a new method of producing separately and economically indazolone derivatives and quinazoline derivatives from azobenzene derivatives.

A further object of the present invention is to produce compounds which are useful for synthetic chemical intermediates in producing dyestuffs, medicines and industrial chemicals.

A further object of the present invention is to provide a method of producing quinazoline derivatives from indazolone derivatives.

Other objects will be apparent from the description of the invention given hereinafter.

The azobenzene derivatives which are starting material of the present invention may have such substituents as are specified by the above general formula. The typical compounds thereof are enumerated as follows:

Azobenzene; haloazobenzene such as 2-chloroazobenzene, 4-chloroazobenzene 2,2'-dichloroazobenzene, and 4,4'-dichloroazobenzene; lower alkylazobenzenes such as 2-methylazobenzene, 4-methylazobenzene, 4,4'-dimethylazobenzene and 4-ethylazobenzene; lower alkoxyazobenzenes such as 2-methoxyazobenzene, 4-methoxyazobenzene 2,2'-dimethoxyazobenzene, and 4,4'-dimethoxyazobenzene; hydroxyazobenzenes such as 4-hydroxyazobenzene; amino- or lower alkylaminoazobenzenes such as 4-aminoazobenzene, 4,4'-diaminoazobenzene, 2-di-(lower alkyl) aminoazobenzenes, and 4-di-(lower alkyl) aminoazobenzenes; arylazobenzene such as 2-phenylazobenzene, and 4-phenylazobenzene.

The symbols R and R' of the azobenzene may be same or different. However, for the purpose of obtaining useful chemicals by further hydrolyzing the present products, it is desirable that the R and R' are same or that either R or R' is hydrogen.

In case azobenzene derivatives having such substituents as are mentioned above are used for the starting material, indazolone derivative or quinazoline derivative obtained therefrom will consequently have the corresponding substituents and will respectively be useful as the specific intermediates for the production of dyestuffs, medicines and industrial chemicals.

The catalyst to be used to practise the method of the present invention is a carbonyl compound of cobalt or iron, or is a metal or compound of cobalt and iron which can produce said carbonyl compound under the reaction conditions of the present invention. For example, cobalt carbonyl, iron carbonyl, inorganic and organic acid salts of cobalt, and cobalt complex salts are typical. Cobalt carbonyl is most preferable.

According to one embodiment of the method of the present invention, a starting material of azobenzene derivative is dissolved in a proper organic solvent, a catalytic amount of one or more of the above mentioned catalysts is added thereto and the solution is introduced into an autoclave. An organic solvent which is inactive in this reaction and which has a proper solubility can be used but a solvent which is high in polarity and has a low dielectric constant is improper. Usually an aliphatic hydrocarbon or an aromatic hydrocarbon can be used. Especially the latter is preferable. Then, carbon monoxide is pressed under a pressure of about 10 to 200 or more atmospheres, preferably 100 to 200 atmospheres, into the contents of the autoclave. When said contents are heated preferably while being shaken at a temperature of about 150 to about 300° C. for about 0.5 to 3 hours, the carbon monoxide is quickly absorbed and the reaction proceeds. After completion of the reaction, the contents are cooled and the excess gas is discharged. Then the contents of the autoclave are taken out. The objective reaction product is taken out from the reaction product mixture by a proper means. For example, after the solvent is distilled off, the residue is dissolved in a dilute alkaline solution. Insoluble substances are removed by filtration. The filtrate is made acidic. The thus deposited solid is separated and is then refined by recrystallization. By-product diphenylurea or its derivative is obtained from the residue insoluble in said dilute alkaline solution.

The reaction temperature in this reaction is a critical condition in determining the process of the reaction. In case a comparatively low temperature of 150 to 200° C. or specifically about 180° C. is adopted in the above mentioned range of temperature conditions, an indazolone derivative is mainly obtained as the reaction product. On the other hand, if a comparatively high temperature of 200 to 300° C. or specifically higher than 230° C. is adopted, a quinazoline derivative is mainly obtained. Further, after or without taking out of the reaction system the indazolone derivative obtained by employing said comparatively low temperature, if the reaction is repeated under the same condition except that the temperature is raised above 230° C., a quinazoline derivative will be likewise obtained. Therefore, the indazolone derivative can be considered to be an intermediate product in producing a quinazoline derivative from a starting material azobenzene derivative according to the present invention. If an intermediary temperature within said temperature ranges, for example, about 200° C. is adopted, a various mixture of an indazolone derivative and a quinazoline derivative can be obtained depending upon the reaction conditions.

The reaction of the present invention is substantially completed within a short perior after the beginning of the reaction under such reaction conditions as are mentioned above. The life of the catalyst is pretty long. Therefore, the method of the present application can be practised also by such batch process as is shown in the above embodiment or by continuous operation of any system.

The indazolone derivatives and quinazoline derivatives obtained by the method of the present invention can be used as they are or converted by various chemical reactions into other useful chemicals. Further, especially the quinazoline derivatives will give anthranilic acid derivatives at favorable yields by hydrolysis.

The following examples are to exemplify favorable embodiments of the method of the present invention but should not be construed for limitation.

*Example 1*

5 g. of azobenzene, 1 g. of cobalt carbonyl and 50 cc. of benzene were put into a stainless steel (18–8) autoclave (a capacity of 100 cc.). Carbon monoxide under 150 atmospheres was pressed into the autoclave. The contents were shaken at 170 to 180° C. After 2 hours, the contents of the autoclave were taken out. The insoluble crude product was taken by filtration and was treated with 2 to 3% sodium hydroxide solution and insoluble diphenylurea was removed. The alkaline solution was made acidic with $CO_2$ or an acid. The acidic substance thus deposited was recrystallized from alcohol.

The yield of 2-phenylindazolone was 2.8 g. (49.1% of the calculated amount). Its melting point was 204° C.

*Example 2*

1.2 g. (35.2% of the calculated amount) of 2-phenyl-5-methylindazolone of a melting point of 252° C. could be obtained by the same method as of Example 1 from 5 g. of 4-methylazobenzene, 1 g. of cobalt carbonyl and 50 cc. of benzene.

*Example 3*

1.3 g. (23.8% of the calculated amount) of 2-phenyl-5-chloroindazolone of a melting point of 233° C. were obtained under the same reaction condition as in Example 1 from 5 g. of 4-chloroazobenzene, 1 g. of cobalt carbonyl and 50 cc. of benzene.

*Example 4*

5 g. of 4-dimethylaminoazobenzene, 1 g. of cobalt carbonyl and 50 cc. of benzene were contained in a stainless steel autoclave of a capacity of 100 cc. and carbon monoxide under 150 atmospheres was pressed in and was made to react therewith at 170 to 180° C. for 3 hours. The reaction product was filtered. When the filtrate was concentrated, a crude product was obtained. After said crude product was made acidic with dilute hydrochloric acid, it was neutralized with dilute sodium hydroxide solution to be slightly acidic (pH 4). Thus 4.5 g. (80.0% of the calculated amount) of 2-phenyl-5-dimethylamino-indazolone of a melting point of 217° C. were obtained.

*Example 5*

5 g. of azobenzene, 1 g. of cobalt carbonyl and 50 cc. of benzene were put into a stainless steel (18–8) autoclave of a capacity of 100 cc., carbon monoxide under 150 atmospheres was pressed therein and was made to react with the contents at 230° C. After 3 hours, the contents were taken out. When they were filtered, 5.2 g. of a crystallized mixture were obtained. The mixture was treated with 2 to 3% sodium hydroxide solution and 1.0 g. (17.2% of the calculated amount) of insoluble diphenylurea were removed. When the alkaline solution was made acidic with $CO_2$ or hydrochloric acid, 4.2 g. of crude 3-phenyl-2.4-dioxo-1.2.3.4-tetrahydroquinazoline were obtained. Its melting point was 273 to 275° C. The yield was 64.6% of the calculated amount.

*Example 6*

When 5 g. of azobenzene, 1 g. of iron carbonyl and 50 cc. of benzene were treated the same as in Example 5, the yield of 3-phenyl-2.4-dioxo-1.2.3.4-tetrahydroquinazoline was 15.4%.

*Example 7*

When 5 g. of azobenzene, 1 g. of acetylacetonecobalt complex compound and 50 cc. of benzene were treated the same as in Example 5, 1.5 g. (23.1%) of 3-phenyl-2.4-dioxo-1.2.3.4-tetrahydroquinazoline and 0.3 g. of diphenylurea were obtained.

*Example 8*

When 5 g. of azobenzene, 1 g. of cobalt stearate and 50 cc. of benzene were treated the same as in Example 5, 1.9 g. (29.2%) of 3-phenyl-2.4-dioxo-1.2.3.4-tetrahydroquinazoline and 0.5 g. of diphenylurea were obtained.

*Example 9*

When 5 g. of 4-methylazobenzene, 1 g. of cobalt carbonyl and 50 cc. of benzene were treated the same as in Example 5, 2.3 g. (35.9%) of 3-phenyl-6-methyl-2.4-dioxo-1.2.3.4-tetrahydroquinazoline of a melting point of 295 to 296° C. and 0.2 g. of a diphenylurea derivative were obtained.

*Example 10*

5 g. of 4-dimethylaminoazobenzene, 1 g. of cobalt carbonyl and 50 cc. of benzene were treated the same as in Example 5. When the reaction product was filtered and was recrystallized from alcohol, 1.1 g. (18.0%) of 3-phenyl-6-dimethylamino-2.4 - dioxo - 1.2.3.4 - tetrahydroquinazoline of a melting point of 281° C. were obtained.

*Example 11*

When 1 g. of 4.4'-dimethylazobenzene, 1 g. of cobalt carbonyl and 50 cc. of benzene were treated under the same condition as in Example 5, 0.5 g. (40.0%) of 3-p-tolyl-6-methyl-2.4-dioxo-1.2.3.4-tetrahydroquinazoline of a melting point of 285° C. was obtained.

*Example 12*

When 1 g. of 4.4'-dichloroazobenzene, 1 g. of cobalt carbonyl and 50 cc. of benzene were treated under the same reaction condition as in Example 5, 0.2 g. (16.7%) of 3-p-chlorophenyl-6-chloro-2.4-dioxo-1.2.3.4-tetrahydroquinazoline of a melting point of 325° C. was obtained.

*Example 13*

When 3 g. of 4.4'-dimethoxyazobenzene, 1 g. of cobalt carbonyl and 50 cc. of benzene were treated the same as in Example 5, 1.0 g. (27.7%) of 3-p-methoxyphenyl-6-methoxy-2.4-dioxo-1.2.3.4-tetrahydroquinazoline of a melting point of 279° C. was obtained.

*Example 14*

2 g. of phenylindazolone, 1 g. of cobalt carbonyl and 50 cc. of benzene were put into a stainless steel autoclave of a capacity of 100 cc. Carbon monoxide under 150 atmospheres was pressed into the autoclave and was made to react with the contents at 230° C. After 2 hours, the product was taken by filtration. When it was treated with dilute hydrochloric acid and was recrystallized from alcohol, 1.8 g. of (81.8%) of 3-phenyl-2.4-dioxo-1.2.3.4-tetrahydroquinazoline were obtained.

*Example 15*

When 1 g. of 2-phenyl-5-methylindazolone, 1 g. of cobalt carbonyl and 50 cc. of benzene were treated by the same operation as in Example 14, 0.5 g. (45.4%) of 3-phenyl-6-methyl-2.4-dioxo - 1.2.3.4 - tetrahydroquinazoline was obtained.

*Example 16*

When 1 g. of 2-phenyl-5-chloroindazolone, 1 g. of cobalt carbonyl and 50 cc. of benzene were treated the same as in Example 14, 0.4 g. (36.3%) of 3-phenyl-6 - chloro - 2.4 - dioxo - 1.2.3.4-tetrahydroquinazoline was obtained.

We claim:

1. A method of producing a 3-phenylquinazoline-2,4-dione comprising contacting azobenzene with carbon monoxide in benzene at a pressure of at least about 10 atmospheres and a temperature of from about 200–300° centigrade in the presence of cobalt carbonyl.

2. A method of producing a 3-phenylquinazoline-2,4-dione comprising contacting azobenzene with carbon monoxide in benzene at a pressure of at least about 10 atmospheres and a temperature of from about 200–300° centigrade in the presence of iron carbonyl.

3. A method of producing quinazoline derivative comprising contacting an azobenzene of the formula,

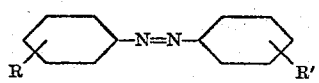

wherein R and R' are selected from the group consisting of hydrogen and chlorine atoms, and methyl, methoxy and dimethylamino radicals, with carbon monoxide in benzene at a pressure of at least about 10 atmospheres and a temperature of from about 200 to 300° centigrade in the presence of cobalt carbonyl.

4. A method of producing quinazoline derivative comprising contacting an azobenzene of the formula,

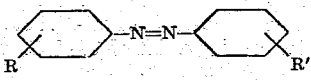

wherein R and R' are selected from the group consisting of hydrogen and chlorine atoms, and methyl, methoxy and dimethylamino radicals, with carbon monoxide in benzene at a pressure of at least about 10 atmospheres and a temperature of from about 200 to 300° centigrade in the presence of iron carbonyl.

References Cited in the file of this patent

UNITED STATES PATENTS 2,769,003    Prichard _____ Oct. 30, 1956

OTHER REFERENCES

Groggins, Unit Processes, 4th Ed. (1952), McGraw-Hill, N.Y., page 562.